(12) United States Patent
Vanhoeck (10) Patent No.: US 12,269,193 B2
(45) Date of Patent: Apr. 8, 2025

(54) TEXTILE ARTICLE AND METHOD FOR THE PRODUCTION AND DISASSEMBLY OF A TEXTILE ARTICLE

(71) Applicant: REGENERATION BVBA, Waarschoot (BE)

(72) Inventor: Cédric Vanhoeck, Waarschoot (BE)

(73) Assignee: REGENERATION BVBA, Waarschoot (BE)

( * ) Notice: Subject to any disclaimer, the term of this patent is extended or adjusted under 35 U.S.C. 154(b) by 1173 days.

(21) Appl. No.: 16/979,319

(22) PCT Filed: Mar. 12, 2019

(86) PCT No.: PCT/IB2019/051994
§ 371 (c)(1),
(2) Date: Sep. 9, 2020

(87) PCT Pub. No.: WO2019/175766
PCT Pub. Date: Sep. 19, 2019

(65) Prior Publication Data
US 2021/0060821 A1   Mar. 4, 2021

(30) Foreign Application Priority Data
Mar. 12, 2018   (BE) .................................. 2018/5146

(51) Int. Cl.
*B29B 17/02*   (2006.01)
*D01F 6/06*   (2006.01)
(Continued)

(52) U.S. Cl.
CPC ................ *B29B 17/02* (2013.01); *D01F 6/06* (2013.01); *D01F 6/60* (2013.01); *D01F 6/625* (2013.01);
(Continued)

(58) Field of Classification Search
CPC .......... D04B 19/00; D06H 7/22; D06H 7/221; D06H 7/223; D06H 7/225; B26F 3/06;
(Continued)

(56) References Cited

U.S. PATENT DOCUMENTS 2,898,663 A * 8/1959 Kitahara ................... B26F 3/06
156/251
2,969,580 A * 1/1961 Wyner ................... D06H 7/225
66/147

(Continued)

FOREIGN PATENT DOCUMENTS

AU   2002259167 B2 † 11/2002
DE      2702112 A1 †  7/1978
(Continued)

OTHER PUBLICATIONS

ISR-WO from parent application PCT/IB2019/051994 dated Jun. 19, 2019.
(Continued)

*Primary Examiner* — Danny Worrell
(74) *Attorney, Agent, or Firm* — Vorys, Sater, Seymour and Pease, LLP (57) ABSTRACT

The present invention related to a method of for the production of textile articles, I which the textile articles can be disassembled automatically or semi-automatically, in which, when sewing or stitching, a polymer melt yarn is used.

19 Claims, 1 Drawing Sheet

(51) Int. Cl.
*D01F 6/60* (2006.01)
*D01F 6/62* (2006.01)
*D01G 11/00* (2006.01)
*D06C 7/00* (2006.01)
*B29L 31/00* (2006.01)

(52) U.S. Cl.
CPC .............. *D01G 11/00* (2013.01); *D06C 7/00* (2013.01); *B29B 2017/0255* (2013.01); *B29L 2031/726* (2013.01)

(58) Field of Classification Search
CPC ......... B26F 2210/12; B29B 2017/0255; B29B 2017/0262; Y02W 30/66; D05B 1/12; D05B 1/08; D05B 1/10; D05B 5/00
USPC ..................... 112/403; 28/171, 168; 66/170
See application file for complete search history.

(56) References Cited

U.S. PATENT DOCUMENTS

| | | | | |
|---|---|---|---|---|
| 3,893,213 A | * | 7/1975 | Rockman | D04B 35/22 83/365 |
| 3,945,096 A | * | 3/1976 | Miranker | D06H 7/225 83/53 |
| 4,033,151 A | * | 7/1977 | Jansen | D04B 35/22 83/53 |
| 4,722,121 A | * | 2/1988 | McPeak | D04B 1/24 28/168 |
| 4,759,106 A | * | 7/1988 | McPeak | D04B 1/24 28/168 |
| 4,783,355 A | * | 11/1988 | Mueller | D03D 15/292 428/43 |
| 5,353,486 A | * | 10/1994 | Schmidt | D04B 21/16 602/8 |
| 9,556,539 B2 | † | 1/2017 | Miyauchi | |
| 10,125,452 B2 | * | 11/2018 | Russell | B02C 23/00 |
| 2019/0208862 A1 | † | 7/2019 | Poegi | |
| 2021/0040652 A1 | * | 2/2021 | Trovi | D01G 11/00 |
| 2021/0060821 A1 | * | 3/2021 | Vanhoech | D05B 5/00 |
| 2023/0304214 A1 | * | 9/2023 | Cen | B32B 5/2795 |

FOREIGN PATENT DOCUMENTS

| | | |
|---|---|---|
| EP | 0800808 A | 10/1997 |
| EP | 0967314 | 12/1999 |
| JP | 2001 254331 A | 9/2001 |
| WO | 03/062513 A2 † | 7/2003 |
| WO | 2013189956 A1 | 12/2013 |
| WO | 2019/155395 A1 † | 8/2019 |
| WO | 2019175766 A1 | 9/2019 |

OTHER PUBLICATIONS

Data Sheet for Thunderon—Conductive Fibers—Acrylic and Nylon Fiber Coated with Copper Sulfide (Nov. 22, 2006).
A. Luiken and G Bouwhuis, Recovery and recycling of denim waste available online May 1, 2015 Published by Elsevier Ltd.†

\* cited by examiner
† cited by third party

TEXTILE ARTICLE AND METHOD FOR THE PRODUCTION AND DISASSEMBLY OF A TEXTILE ARTICLE

TECHNICAL DOMAIN

The invention relates to a method for the production and disassembly of textile articles, in which the textile articles can be disassembled automatically or semi-automatically.

STATE OF THE ART

The textile industry is the second most-polluting industry in the world (after the petrochemical industry). Today, one lorry filled with textile is discarded every second. Only 1% of the materials used in the textile industry, are recycled. Material with a value of 50 billion of dollars is not re-used every year (source: Mac Arthur Foundation). These facts, although to a lesser degree, are also true for the furniture industry and other textile-based industries. Examples thereof are clothing, footwear, furniture, floor covering, mattresses, bedclothes and car parts such as air bags, seat covering and safety belts.

The vast majority of textile-based products composed of several components are not reusable or are very difficult to recycle into usable products at the end of their useful or expected life.

Discarded textile products mostly end up in combustion furnaces or dumping sites. If they are still recycled, they are cut into small pieces by shredders. In the best case, the different materials, of which the product was composed, are then separated: the shredded pieces are sorted according to their type of material under the influence of air pressure and centrifugal forces. This is an energy-intensive and complex process that results in the decreased quality and economic value of the recycled material.

Because the recycled material has a poorer quality than the original material, it cannot be reused in the same industry or for the same original application. Recycled textile and leather are for example mainly used in isolation mats, textile and moving cloths and as a filler for concrete and polymer production. This kind of recycling is also known under the term "down-cycling".

The reduction in the quality of the recycled material is mainly due to two factors. Firstly, as a result of the chipping, the size of the materials is strongly limited, which leads to a reduction of the mechanical characteristics of the materials and associated reduction in value. Secondly, the reduced purity of the recycled materials also plays a role. Most textile products are indeed made of different materials, each requiring a different recycling procedure. Contamination of one material with another material is the main reason why the quality of recycled textile materials is poorer.

Both chemical and mechanical recycling processes also have difficulties with hard points, such as zippers and buttons. During mechanical recycling (i.e. fiberizing) and chemical recycling (i.e. de- and repolymerisation processes such as econyle on the one hand and visocosis processes such as saxell refibra and renewcell on the other hand), hard points cause blockages and damage to machines. Hard points thus have to be removed before starting recycling processes. This action is called delissage and is carried out in two ways nowadays: one the one hand manually and on the other hand with stronger and coarser fiberizers such as the exel shredder of laroche. Unfortunately, manual removal of hard points is economically not cost-effective and research has shown that with coarser fiberizers, fibres are obtained that are too short (poor quality).

Consequently, there is a need for a method for efficiently separating or disassembling the individual parts of textile articles during the recycling process that prevents contamination of the materials, removes hard points easily and increases the efficiency and quality of existing recycling processes.

Such a method is known from EP2861793. EP2861793 describes a sewing method with built-in disassembling function. The method of EP2861793 is based on a chemical change in the used yarns based on electromagnetic radiation. This method is time-consuming and difficult to apply on a large scale. The disassembly according to the method of EP2861793 for example takes place in a cage of Faraday, as a result of which it is not possible to carry out the disassembling as a continuous process. Moreover, this method does not allow a specific disassembly and only allows a disassembly of the complete articles.

The present invention aims to find at least a solution for some of the above-mentioned problems or disadvantages.

SUMMARY OF THE INVENTION

Thereto, the invention offers a method according to claim 1. In a first aspect, the invention relates to a method for the production of textile articles, in which the textile articles can be disassembled automatically or semi-automatically because use is made of a polymer melt yarn and in which the disassembly of the produced article takes place by means of the heating of the article or the yarn to a temperature equal to or higher than the melting temperature, as a result of which the stitching come loose.

The impact of the textile industry on the environment should not be underestimated. The textile industry is the second most-polluting industry in the world. The present invention offers a method for solving this problem. Thanks to this invention, one can drastically reduce the amount of textile articles that are discarded, not recycled or not reused.

The built-in disassembling function makes the delissage (removal of hard points such as buttons and zippers) easy and advantageous, as a result of which, during mechanical and chemical recycling, the mechanical characteristics of the recycled material can subsequently be maintained even better. Moreover, the method of the present invention allows to easily disassemble textile articles composed of several components at the end of their useful or expected life. Possible contamination of the recycled materials caused by not or poorly disassembling the different parts, is thus avoided. As the reduction of the quality of recycled materials coming from the textile industry is mainly caused by a decrease in the mechanical characteristics of the material as well as a reduced degree of purity thereof, the present invention allows the skilled worker to obtain high-quality recycling products corning from the textile industry.

The disassembly and the reuse of high-quality materials results on the one hand in a huge financial saving in the processing of textile waste and on the other hand, raw materials are also obtained in this way for the production of new textile articles so that the financial saving also continues in the production of new textile articles. Thanks to the possibility to carry out the disassembling process semi-automatically or fully automatically this is—contrary to the existing processes for recycling textile articles—a time-saving process and consequently also a relatively cheap process. Calculations have shown that the cost with respect to the current known manual methods can be reduced by at least 20% and more.

The built-in disassembling function of the present invention is based on the use of a polymer melt yarn for the stitching or sewing of the textile articles during the production process of these textile articles. Disassembling of the different parts and materials of the textile article can be carried out easily by heating the yarn. Correspondingly, in a second aspect, the invention provides a melt yarn according to claim 9. More in particular, it relates to a melt yarn comprising one or more longitudinally parallel filaments, in which the melting temperature of the filaments is situated between 60° C. and 200° C.

The invention can be introduced in the textile industry without requiring significant changes to the production facilities. The melt yarn is indeed appropriate for being used in the existing sewing machines and provides strong stitches.

In a third aspect, the invention provides a textile article according to claim 14. More in particular, it relates to a textile article that can be disassembled automatically or semi-automatically. In a preferred embodiment, the textile article is obtained via a method of any one of the claims 1-8 or in which the textile article uses one or more yarns of any one of the claims 9-13. Correspondingly, in a fourth and last aspect, the invention provides a method according to claim 18. More in particular, it relates to a method for disassembling a textile article of claim 14 or obtained by means of a melt yarn of any one of the claims 9-13, characterized in that the melt yarn is heated to a temperature that is situated within the range of the melting temperature of the melt yarn.

The materials that are obtained thanks to the invention after disassembling the textile articles can be used as raw materials for the production of new textile articles thanks to the maintenance of their mechanical characteristics and their high degree of purity. In this way, the present invention does not only help to reduce the mountain of waste caused by the textile industry and the associated pressure onto our ecological system, but also to reduce the energy and water consumption that is associated with the production of new unused textile materials.

DETAILED DESCRIPTION

The invention relates to the end-of-life processes of textile articles and offers a method for the production and disassembly of textile articles, in which the textile articles can be disassembled automatically or semi-automatically. Contrary to the state of the art, the method is based on a physical phase change, also known as a change of aggregation state, obtained by a change in environmental temperature, in the present case a temperature increase. This is a different process from the state of the art as described in EP2861793 in which use is made of radiation to adjust the mechanical characteristics of the material. Such radiation induces depolymerization and subsequently a reduction in mechanical characteristics. In the method as described here, no chemical reaction takes place and thus neither does depolymerization. The method is only based on a physical change of phase in which yarn evolves from a solid state to a 'liquid' state. Thanks to a sophisticated range of yarns with specific melting temperature, only the used yarn will melt at an increase of the temperature and the textile article and its components further remain intact. It is important here that these yarns have a high thermal conduction, whereas the yarns used for radiation disassembly will mainly have an isolating function.

The present methodology, yarn and devices contribute to a simple and ecological way of disassembling textile articles and thus contribute to an improved circular economy, that can be applied on a large scale.

Unless otherwise specified, all terms used in the description of the invention, including technical and scientific terms, shall have the meaning as they are generally understood by the worker in the technical field of the invention. For a better understanding of the description of the invention, the following terms are explained specifically.

"A", "an" and "the" refer in the document to both the singular and the plural form unless clearly understood differently in the context. "A segment" means for example one or more than one segment.

When "approximately" or "about" are used in the document together with a measurable quantity, a parameter, a period or moment, etc., variations of +/−20% or less, preferably +/−10% or less, more preferably +/−5% or less, still more preferably +/−1% or less, and even still more preferably +/−0.1% or less than and of the cited value are meant, as far as such variations apply to the invention that is described. It will however be clearly understood that the value of the quantity at which the term "approximately" or "about" is used, is itself specified.

The terms "include", "including", "consist", "consisting", "provide with", "contain", "containing", "comprise", "comprising" are synonyms and are inclusive of open terms that indicate the presence of what follows, and that do not exclude or prevent the presence of other components, characteristics, elements, members, steps, known from or described in the state of the art.

The citation of numeric intervals by means of end points includes all integers, fractions and/or real numbers between the end points, including these end points.

"Textile" is a transformable material consisting of filaments (endless threads) or fibres (short pieces of threads). Textile can be one-, two- or three-dimensional.

The term "textile article" or "textile-based article" is used here to indicate objects at least partially consisting of textile and/or leather (leather from animal skins or synthetic leather). Non-limiting examples of textile articles are clothing and footwear, protective clothing such as gloves against cuts, protective clothing and ballistic jackets, household textile articles such as cleaning cloths, floor cloths, sheets, blankets, tea towels, towels, table-cloths and handkerchiefs, furnishing textile such as net curtains, curtains, carpet, floor covering, furniture covering and sun screens; technical textile articles such as canvasses, tents, parachutes, screens, ropes; geotextile such as bank protection, erosion protection, reinforcement of the foundation of roads, rubber reinforcement such as in bicycle and car tires, conveyor belts, tubes, rubber boats and textile articles for vehicles such as cars, trains and air planes such as air bags, seat coverings and safety belts.

The terms "automatic" and "semi-automatic" refer, within the context of the present invention, to a process in which the disassembly of the textile articles does not take place manually, but, on the contrary, is carried out completely (automatic) or largely (semi-automatic) by a machine or device.

A "yarn" or thread is used to refer to a thread that is made by spinning fibres or to refer to filament yarns, that are basically endless and thus already form a yarn. In the context of the present invention, a distinction is made between "standard yarn" and "melt yarn".

The term "standard yarn" comprises both sewing thread and embroidery thread. The term "standard yarn" refers amongst other things to stitching threads that are mainly intended for sewing two parts together, decorative threads (such as metal threads or thicker threads) and lock threads that are optimal for use in locking machines. The term "standard yarn" further refers to threads that are generally known and are used in the textile industry for the production of textile articles. In particular, a standard yarn will be a yarn that is made of a material selected from the group of cotton, linen, polyester, rayon, wool, nylon, silk or a combination thereof. This yarn will moreover not melt within the range of the melting temperature of the melt yarn and thus it will not undergo a physical change at temperatures situated within the range of the melting temperature of the melt yarn.

The term "melt yarn" refers to a thread with a known melting point or melting temperature, in which the thread melts when it is heated to a temperature within the range of the melting temperature of the thread.

The term "sewing" refers to the processing and fabricating by means of a needle and thread of something like for example the mutual attachment of parts by means of a needle and thread. Sewing can take place manually or by machine. When a sewing machine is used for sewing, the term "stitching" is used. The term "sewing" thus also comprises the mechanical stitching by means of a needle and thread.

The term "thermoplastic polymer" refers to a polymer material that undergoes a change in physical state under the influence of temperature. Thus, a thermoplastic polymer will become soft or (semi-)liquid under the influence of heat and will become solid again when cooling down. In particular, a thermoplastic polymer will change from a solid state to the liquid state when it is heated to a temperature that is higher than or equal to the melting point of the polymer. The term "polymer" is used to indicate an organic compound of which the molecules consist of a succession of identical or similar parts, the monomers, that are linked chemically to each other. The term "melting point" or "melting temperature" thus refers to the temperature at which the transition of the solid or soft state to the liquid state takes place by breaking down mainly secondary compounds such as van der Waals and hydrogen compounds.

The term "monofilament" refers to threads consisting of only one filament, contrary to the term "multifilament" that refers to threads consisting of more than one filament.

A "twined" yarn is obtained by "twining" several yarns. Hereby, "twining" refers to twisting together at least two yarns into one yarn, in which the characteristics of the resulting composed yarn are different from the characteristics of the individual yarns.

The "thickness" of a yarn is described in the present invention by means of a weight number and/or a length number. The "weight number" of the yarn corresponds to the weight in gram of 1000 m of yarn in which 1 g/1000 m is indicated within the field as "1 tex". The "length number" of the yarn corresponds to the number of times a yarn length of 1,6934 m fits in 1 gram.

The "tensile strength" is a measure for the maximal tractive force that is exercised at the ends of the yarn exactly before the yarn breaks under the influence of the increasing tractive force.

The "elasticity" of a yarn describes the maximal increase in length when a maximum tractive force is exercised at the ends of the yarn without the yarn breaking.

In a first aspect, the invention relates to a method for the production and disassembly of textile articles, in which the textile articles can be disassembled and thus recycled or reused automatically or semi-automatically. In particular, when sewing or stitching the textile article, a melt yarn will be used, in which the melt yarn has a melting temperature and in which the melt yarn transitions from a solid phase to a liquid or semi-liquid phase at a temperature that is equal to or higher than the melting temperature of the yarn and in which the disassembly is realized by heating the melt yarn and/or the article to a temperature that is equal to or higher than the melting temperature of the melt yarn. In an embodiment, when stitching or sewing a polymer, a melt yarn will be used with a melting temperature situated between 60° C. and 200° C. and in which the disassembly will be realized by means of heating the melt yarn and/or the article to a temperature situated within the range of the melting temperature of the melt yarn. In an embodiment, the present invention also relates to rivets that are partially or completely made of a melt polymer with a melting temperature within the range of 60° C. to 200° C. At exposure to a temperature within this temperature range, the rivets will disintegrate. In a particular embodiment, the present invention thus relates to a method for disassembling rivets from textile articles, in which the rivets can be disassembled and thus recycled or reused automatically or semi-automatically, and in which the rivets are at least partially made of a melt polymer and in which the melt polymer will transition from a solid phase to a liquid phase at a temperature that is equal to or higher than the melting temperature of the polymer and in which the disassembly is realized by means of heating the rivet and/or the article to a temperature that is equal to or higher than the melting temperature of the melt polymer. Preferably, the melting temperature of the melt polymer will be situated between 60° C. and 200° C., preferably between 80° C. and 200° C.

In a second aspect, the invention relates to a melt yarn comprising one or more longitudinal parallel filaments, as well as a rivet, in which the melting temperature of the filaments is situated between 60° C. and 200° C., preferably between 80° C. and 200° C., preferably between 110° C. and 190° C., between 160 and 190° C., more preferably between 130° C. and 180° C., most preferably between 150° C. and 190° C.

Most textile products are made of different materials, each requiring a different recycling procedure. Contamination of one material with another material leads to a reduced quality of recycled textile materials. The different materials that are present in textile articles made according to the present invention can, thanks to the use of a polymer melt yarn, be disassembled in a non-destructive way into units consisting of only one material. The purity of the resulting recycled material is maintained. As a result, these textile articles can, after use, be recycled easily, efficiently and qualitatively and the mechanical characteristics of the recycled material can be maintained better.

As the reduction of the quality of recycled materials coming from the textile industry is mainly caused by a decrease in the mechanical characteristics of the material as well as a reduced degree of purity thereof, the present invention allows the skilled worker to obtain high-quality recycling products coming from the textile industry.

It is remarkable that only 1% of the materials in the textile industry are recycled. Every year, the single use of textile materials results in the wasting of materials that are worth approximately 40 billion of dollars. Thus, there clearly is an enormous financial potential in recycling textile articles. By reusing or recycling materials in the textile industry by means of the present invention, it is possible to respond to this. On the one hand, the disassembly and the reuse of high-quality materials results in an enormous financial saving in the processing of textile waste. On the other hand, in this way, raw materials can be obtained for the production of new textile articles so that the financial saving also continues in the production of new textile articles. Thanks to the possibility to carry out the disassembling process semi-automatically or fully automatically, this is—contrary to the existing processes for recycling textile articles—a time-saving process and consequently also a relatively cheap process.

The invention can be introduced in the textile industry without requiring significant changes to the production facilities. The melt yarn is indeed appropriate for being used in the existing sewing machines and provides strong stitches.

The textile industry is the second most-polluting industry in the world. Today, one lorry filled with textile is discarded every second. Discarded textile products mostly end up in combustion furnaces or dumping sites. The impact of the textile industry on the environment is enormous. The present invention offers a method for solving this problem. Thanks to this invention, one can drastically reduce the amount of textile articles that are discarded, not recycled or not reused. Moreover, the materials that are obtained thanks to the invention after disassembling the textile articles can be used as raw materials for the production of new textile articles. In this way, the present invention does not only help to reduce the mountain of waste caused by the textile industry and the associated pressure onto our ecological system, but also to reduce the energy and water consumption that is associated with the production of new unused textile materials.

The built-in disassembling function of the present invention is based on the use of a polymer melt yarn for the stitching or sewing of the textile articles during the production process of these textile articles. Disassembly of the different parts and materials of the textile article can be realized by heating the yarn to a temperature situated within the range of the melting temperature of the yarn. Preferably, the article or the melt yarn is heated to a temperature that is equal to or higher than the melting temperature of the melt yarn. The melting temperature of the polymer melt yarn is preferably higher than 60° C., preferably higher than 80° C. At a lower melting temperature, the integrity of the assembled textile articles could be compromised in daily situations in which the articles are exposed to temperature increases, such as for example in the washing machine or drier. Moreover, the temperature of the melt yarn can increase, through friction, when it is used for sewing by means of industrial sewing machines. Also, a melting temperature of minimum 60° C., preferably minimum 80° C. guarantees that the melt yarn will not melt during the production of the textile articles. On the other hand, the melting temperature of the polymer melt yarn should preferably be lower than 200° C., since synthetic textile materials possibly also melt at temperatures that are higher than 200° C., so that they get lost or can cause undesired contamination with the other materials. Preferably, the melting temperature of the polymer melt yarn is situated between 60 and 200° C., 80 and 200° C., 110° C. and 180° C., most preferably between 150° C. and 190° C. The inventors have found that when a melt yarn with a melting temperature situated between 150° C. and 180° C. is used, the probability that the article is disassembled accidentally, is the smallest since there is little chance that this is exposed accidentally to this temperature. On the other hand, most synthetic materials of which the textile articles are composed, will not be affected at this temperature.

Sewing or processing or fabricating a textile article by means of a needle and thread, is possible with different kinds of stitches. An additional advantage of the present method is that it can be realized by means of the sewing machines as they are used now in the textile industry without first having to adjust or replace them thereto. This means that the implementation of this methods does not require large investments for companies.

In the textile industry, for sewing different kinds of stitches, different sewing machines are used that make stitches that mostly fall into one of the following four categories. A first kind of stitch is the chain stitch. This stitch is mostly obtained with one single thread forming a loop in itself. In this case, it is sufficient to replace this thread by melt yarn. Preferably, for the production of textile articles according to a further embodiment of the present invention, when sewing, at least one melt yarn is used in combination with at least one standard yarn. This is the case when forming the three remaining kind of stitches.

The second kind of stitch and associated machine is the lock stitch, that is also used in household sewing machines and in which two yarns are used: the "upper yarn" and the "lower yarn". They cross each other and, in this way, a stitch is made. At this kind of stitch, it is sufficient to replace at least one of the two yarns by a melt yarn to subsequently obtain a built-in disassembling function according to the method of the invention. Moreover, it is usual that only the upper yarn is visible in the finished textile product. Preferably, the lower yarn consists of a melt yarn and the upper yarn of a standard yarn. In this way, one combines the built-in disassembling function with the aesthetic aspects of the standard yarn, without having to make any special adjustments to the aesthetic aspects of the textile article or to the production facilities (namely the sewing machine).

A third kind of stitch, the "overlock stitch" and associated "overlock" or "serger" machine, is obtained by making a series of yarn loops that are sewed over the fabric edge of the fabric parts of the textile articles. The overlock stitch can also be used to sew edges and seams. Mostly, when sewing with an overlock, at least three yarns are used. Here too, it is possible to replace at least one yarn by a melt yarn in order to build in the disassembling function during the production process of the textile article. Depending on the kind of overlock stitch and the total number of yarns that is used to make the stitch, it can be necessary to replace more than one yarn by a melt yarn, this will be clear for the skilled worker once he or she has studied the stitch.

A fourth kind of stitch, the "cover stitch" or flat seam stitch looks like two parallel lock stitches viewed from above and like an overlock stitch viewed from below. Just like the overlock stitch, this stitch also consists of several upper yarns and lower yarns.

Corresponding to the formation of the different stitches, that are responsible for the stitching between two lower parts of the textile article, according to a further embodiment of the invention, at least one melt yarn, whether or not combined with a standard yarn, is used when sewing or stitching.

When heating, the melt yarn will melt as a result of which the stitch loses its stitching capacity and the textile article disintegrates into different parts.

In an embodiment, at least one of the (lower) yarns is replaced by a melt yarn in order to build in the disassembling function during the production process of the textile article. By using a standard yarn for the upper yarns, the aesthetics aspect of the stitches remains unmodified. In another embodiment, for both the lower yarn and the upper yarn, a melt yarn is used, in which the chosen melt yarn can be the same yarn for the lower and upper yarn or a melt yarn that has different characteristics (such as for example tensile strength, dtex, nature of the polymer, etc.).

Despite the fact that there are innumerable kinds of stitches, they mostly can be considered as a variation of one of these four kinds of stitches, and it will be clear for the skilled worker which yarns are preferably be replaced by melt yarns when realizing the method of the present invention.

As said above, the present invention is compatible with the existing industrial sewing machines. Moreover, as a result of the choice of the yarn that is replaced by a melt yarn, the invention can be realized without compromising the aesthetic aspect of the textile articles since the visible yarn is still the standard yarn. Consequently, the introduction of the invention in the present textile industry almost doesn't require any financial investment by means of an adapted equipment or the replacement of all yarns.

According to a further embodiment of the invention, the polymer consists of melt yarn for at least 40%, preferably at least 50%, more preferably at least 70%, still more preferably at least 80%, still more preferably at least 90% and most preferably at least 100% of thermoplastic polymer with a melting temperatures situated between 60° C. and 200° C., more in particular between 80° C. and 200° C., in which one or more polymers are chosen from the group of polyolefines, polyesters, polypropylene, polyurethane, polyoxymethylene (POM), polyamides such as polyamide 11 (PA11), polylactic acid (PLA) and co-polymers thereof. The inventors have found that, with the above-mentioned composition, the automatic or semi-automatic disassembling function remains guaranteed when the melt yarn partially consists of other materials. Thus, the melt yarn can for example partially consist of polymers having a melting temperature that is higher than 200° C., that can for example increase the tensile strength of the melt yarn or that can for example decrease the elongation of melt yarn.

Polyolefines are polymers exclusively based on carbon and hydrogen, in which the best-known polyolefines are polyethylene or polyethene (PE), polypropylene or polypropene (PP), polybutylene or poly(1-butene) and (PB) polyisobutylene or polyisobutene (PIB). Of course, the melt yarn can also consist of less well-known polyolefines with the desired characteristics. The polyolefines also comprise co-polymers, for example, but not limited to ethylene vinyl acetate (EVA) or co-polymers of ethene with acrylate esters.

In an embodiment, the yarn is made of a bio-sourced plastic. Bio-sourced plastics are polymers that are made of plant-based materials, preferably of renewable sources. These polymers have a much smaller impact on the environment than conventional polymers. An example of such bio-sourced plastic yarn is based on PA11 or polyamide 11. PA11 is a high-quality, light polymer that is made of castor oil, extracted from the seeds of *Ricinus communis*.

Thermoplastic polymers are extremely appropriate for being used in the melt yarn in the present invention. Firstly, the melting point of these polymers can be chosen depending on the application and these polymers can easily be processed into filaments by means of extrusion, which makes them appropriate as a raw material for melt yarns. Secondly, these thermoplastic polymers are characterized by their soft or foldable state at normal environmental temperatures, which is necessary for being used as yarns in the textile industry since most textile articles don't have a rigid structure. Finally, when heating, these polymers will become liquid above the melting point instead of degrading or burning. Thanks to this characteristic, a textile article that has been made by means of this melt yarn, can be disassembled by heating the melt yarn to a temperature situated within the range of the melting point of the polymer. The polymer will in this case melt without damaging the textile article as a result of for example degradation or burning of the yarn. Examples of melt yarns that are appropriate for use in the present invention are shown in table 1 and in the examples.

According to a further embodiment of the invention, the thermoplastic polymer consists of one polymer or of several polymers. Preferably, the melt yarn consists of one kind of thermoplastic polymer, more preferably, and if possible, the thermoplastic polymer consists of melt yarn for the same polymer as the kind of textile onto which one is sewing. This has the advantage that, when the textile article is disassembled, the rests of the polymer melt yarn that could possibly remain on the textile onto which is sewed, do not cause contamination of this textile, since they are made of the same material. As a result, the purity of the textile that is disassembled, is not affected so that a decrease in the quality of the material as a result of contamination with the yarn, is avoided and the quality thus remains maximal.

According to an embodiment, the thermoplastic polymer melt yarn completely (100%) consists of polyester. In about half of all textile articles, polyester is used. By using a thermoplastic polyester filament, as a raw material for the polymer melt yarn, thus in about half of the disassembled textile articles, no contamination of the part made of polyester, will take place. As said above, this is a very important characteristic for the quality of the polyester textile after disassembly. In addition, the inventors have found that this polymer is very useful as a yarn thanks to its high tensile strength, average elongation and high flexibility. Moreover, from polyester, polymer filaments can be made with the desired thermoplastic characteristics so that this polymer is extremely appropriate for being used as a melt yarn at the production of textile articles that can be disassembled automatically or semi-automatically.

In another embodiment, the used yarn is 100% PLA, PP or PET(-G).

In an embodiment, additives or materials are added to the melt yarn for increasing the heat conduction. For avoiding thermal degradation of textile materials during the disassembling phase, the period during which textile products are exposed to heat sources, should be minimized. For this reason, it is desired to increase and accelerate the thermal conduction of the melt yarn, without having to change the melting temperature.

Heat transfer by means of conduction is described by the law of Fourier:

$Q = kA\, dT/d$ $Q$ = heat transfer/heat flux (W)
$A$ = heat transfer surface in cross-section (m$^2$)
$k$ = heat conduction coefficient (W/(m·K))
$dT$ = temperature differences over the material (K)
$d$ = material thickness (in other words, the path between the cold and warm side) (m)

Polymers have a low conduction coefficient of 0.2-0.4 W/(mK). Appropriate additives can be used for increasing the heat conductive power of polymers and allowing a faster and more efficient melting of the yarn during the disassembly of the textile articles.

In an embodiment, one or more additives can be added to the melt yarn for increasing the heat conduction. In an embodiment, said additives are chosen from the group of metals, graphite or ceramic materials, as well as any mixture thereof.

In an embodiment, the additives are added in a weight percentage situated between 1% and 80% w/w, more preferably between 1 and 70% w/w, preferably between 1% and 20%, more preferably between 5 and 10%. In this way, a yarn with a thermal conduction of 1-20 W/(m·K) can be obtained.

Metals have a high intrinsic heat conduction. Thus, aluminium has a range of 200 W/m·K. Their high densities and high electric conduction represent chances with respect to price fixing, as well as any further innovation with respect to portable technology applications in textile.

Metal can be introduced in stitch yarn in different ways. On the one hand, metal can be added as a powder during the melt spinning, or it can be introduced as a staple fibre during the mechanic spinning and twining process. Finally, it can be added as a coating during the sewing of thread finishing processes (after twining).

In an embodiment, the melt yarn is coated with an aluminium coating. Techniques for coating yarns by means of aluminium, are well-known in the state of the art. Known techniques are amongst other things the 'Low Pressure Cold Spray' (LPCS) method, as well as vacuum deposition and printing. Another methodology is to galvanize the yarn without current (process of applying a conductive for a non-conductive material) or to use a polymer coating for obtaining a more homogeneous coating. Finally, Hye Moon Lee describes a 'chemical dissolution process' in which a yarn is pre-treated catalytically for creating 'spots' onto the fibrous structure where aluminium atoms could adhere. Subsequently, the yarn can be brought to room temperature in a solution of aluminium precursor molecules. As a result, the aluminium cores can condensate onto the spots and precipitation can take place. This process results in an aluminium film and aggregation onto the surface of the yarn and in the fibrous structure. Thanks to this process, the yarn becomes thermally and electrically conductive with preservation of the flexibility. Moreover, the coating has a stability on the long term.

In another or further embodiment, ceramic materials are added to the melt yarn. These ceramic materials can be added to the yarn in the form of fillers or powders during the smelt spinning process. Examples of useful ceramic materials are oxides such as aluminium oxide or magnesium oxide (Martoxid®), calcium carbonate (Fiberlink®), magnetite (MagniF), aluminosilicate (Silatherm®), boron nitride (Carbotherm®), dry ground mica (Trefil®).

In another or further embodiment, graphite is added to the melt yarn.

According to a further embodiment of the method for the production of textile articles that can be disassembled automatically or semi-automatically, the used polymer melt yarn is a mono- or multifilament. Natural fibres consist of relatively short filaments and should be processed into multifilaments if they would be used as yarns. Since thermoplastic polymers can principally be made as infinitely long filaments by means of extrusion, they offer the advantage that the monofilament is already appropriate to be used as a yarn.

On the other hand, polymers are also appropriate to be processed as multifilaments into melt yarns. In the present invention, the term "multifilament" means that the yarn is made of more than one filament. In the multifilament melt yarn, the filaments will at least partially overlap over the longitudinal direction of the melt yarn. In this way, one obtains a stronger melt yarn that is not associated with a decrease in flexibility of the melt yarn. Moreover, a stronger melt yarn will also result in a stronger adhesion as a result of the sewing or stitching by means of the melt yarn. The number of filaments in the multifilament melt yarn depends on the application and the kind of textile product that will be produced with it. The physical characteristics (tensile strength and thickness) of the individual polymer filament allow the skilled worker to make the appropriate choice as to the number of filaments that will be processed into a melt yarn.

The "thickness" of a yarn is described in the present invention by means of a weight number and a length number. The "weight number" of the yarn corresponds to the weight in gram of 1000 m of yarn in which 1 g/1000 m is indicated within the field as "1 tex". The "length number" of the yarn corresponds to the number of times a yarn length of 1,6934 m fits in 1 gram. According to a further embodiment of the present invention, the thickness of the melt yarn is characterized by a weight number that is situated between 0.003 g/m (3 tex) and 1.5 g/m (1500 tex). Preferably, the weight number of the melt yarn is 0.005 g/m (5 tex) to 0.03 g/m (30 tex), 0.03 g/m (30 tex) to 0.3 g/m (300 tex), 0.3 g/m (300 tex) to 0.5 g/m (500 tex), 0.5 g/m (500 tex) to 1 g/m (1000 tex) and/of 1 g/m (1000 tex) to 1.5 g/m (1500 tex). In a preferred embodiment, the yarn has a weight number situated between 250 and 2000 Dtex/3, more preferably between 500 and 1500 Dtex/3.

The inventors have found that at these weight numbers, melt yarns are obtained that are appropriate for the production of different textile articles with a built-in disassembling function. Thinner melt yarns are thereby especially, but not exclusively, appropriate for delicate sewing such as for example when assembling parts consisting of thinner fabrics such as lace or chiffon. Thicker melt yarns are, in turn, better appropriate for sewing in which heavier parts or parts that are exposed more to wear, have to be assembled.

The strength of the stitches that arise when two parts are sewed together by means of the melt yarn according to the present invention, is determined by the "tensile strength" or both the melt yarns and other standard yarns that are used for obtaining the stitch. The "tensile strength" is a measure for the maximal tractive force that is exercised at the ends of the yarn exactly before the yarn breaks under the influence of the increasing tractive force. According to a further embodiment, the tensile strength of the melt yarn is situated between 4 N and 800 N. Preferably, the tensile strength of the melt yarn is 5 N to 50 N, 10 N to 50 N, 4 N to 16 N, 16 N to 160 N, 160 N to 300 N or 300 N to 800 N. The tensile strength increases as the thickness of the melt yarn increases. These tensile strengths guarantee the production of a varied assortment of high-quality textile articles in which the use of the melt yarn offers a strong and reliable stitching of the parts.

The "elasticity" of a yarn describes the maximal increase in length when a maximum tractive force is exercised at the ends of the yarn without the yarn breaking. The elasticity of the melt yarn is important because on the one hand, one does not want to obtain a grand stitching that cannot stretch to a lesser degree with the textile parts to which it is present, but on the other hand, one wants to avoid that the assembled parts can be pulled apart temporary as a result of a too high elasticity of the yarn that is used when sewing. The inventors have found that when the elasticity of the melt yarn, according to a further embodiment, is lower than 25%, such as situated between 5% and 30% over the total length of the melt yarn, preferably between 10% and 25%, a melt yarn is obtained with optimal characteristics with respect to the flexibility of the sewing and the integrity of the stitches.

When one chooses for sewing with a multifilament melt yarn for the production of textile articles, that can be disassembled automatically or semi-automatically, these filaments are, according to a further embodiment of the invention, preferably twined. A "twined" yarn is obtained by "twining" several yarns or filaments, hereby a yarn consists of one or several filaments and "twining" refers to pressing together at least two yarns into one yarn, in which the characteristics of the resulting composed yarn differ from the characteristics of the individual yarns. The resulting twined smelt yarn is extremely appropriate for the production of textile articles imposing high requirements as to the strength of the stitches such as for example, but not limited to, seat covering and footwear.

The twining of one or more melt yarns into one single melt yarn is possible in different ways and is mostly realized in two phases.

In a first phase, the yarn is twisted around itself in a mechanical way. In a second phase, the desired number of yarns from the first phase are then taken together and twisted mechanically around each other in the opposite direction compared to the first phase for obtaining in this way a bundle of the desired thickness. As a result, the filaments in the yarns are twisted into each other in a robust way and these filaments will break less easily as a result of friction, if a filament still does break, it will not be able to shift thanks to the twining. Twining of the filaments or melt yarns thus substantially increases the resistance to wear. Moreover, a moderately twined yarn will also become smoother as a result of which it better slides when sewing of stitching.

The twining of the yarns into the desired melt yarn is not only possible thanks to the twisting, but is, for example, also possible as a result of the braiding of the yarns. Of course, other usual ways of twining yarns are also possible for the melt yarn.

When the twining is realized with very much yarns into one single melt yarn, this results in a very strong and/or thick melt yarn that can be used for textile articles needing it such as, for example, but not limited to, parachutes and boat sails.

According to a further embodiment, the twisting onto the filaments of the melt yarn is fixed, preferably by means of a heat treatment, before or after further processing, such as the twining with other filaments or other yarns. Depending on the characteristics of the melt yarn, the temperature of this heat treatment varies between 50° C. and 155° C., preferably between 60° C. and 100° C. By fixing the twisting onto the filaments of the melt yarn, it is avoided that the twisting gets lost during the sewing process as a result of which knots could appear in the melt yarn during the use of the yarn. This process preferably takes place in an autoclave, at a pressure situated between −0.07 and +0.5 MPa.

In a third aspect, the invention relates to a textile article that can be disassembled automatically or semi-automatically. In particular, the textile article will be composed of individual pieces, in which at least some of the individual pieces are attached to each other by means of stitches, and in which for the stitches, at least a polymer melt yarn is used, in which the melt yarn transitions from a solid phase to a liquid or semi-liquid phase at a temperature that is equal to or higher than a melting temperature of the yarn and in which the article can be disassembled into individual pieces by means of heating the article or the stitches to a temperature up to a temperature that is equal to or higher than the melting temperature of the yarn. In an embodiment, a yarn will be used that has a melting temperature situated between 60° C. and 200° C., more preferably between 80° C. and 200° C., and in which the article can be disassembled into individual pieces by heating the article or the stitches to a temperature situated within the range of the melting temperature of the yarn. In an embodiment, the textile article is obtained by a method as described above or in which the textile article uses one or more melt yarns as described above. These textile yarns can be disassembled into high-quality textile parts at the end of their useful or expected life.

In a fourth and last aspect, the invention relates to a method for disassembling a textile article as described above or obtained by means of a melt yarn as described above, in which the melt yarn is heated to a temperature that is situated within the range of the melt temperature of the melt yarn. When melting the yarn, the sewing or stitches lose their integrity. Consequently, the stitch will lose its stitching capacity and the article will disintegrate into the different parts of which the textile article is composed.

The method for disassembling the textile articles according to the present invention results in high-quality recycling products of which the mechanical characteristics are not affected by disintegration and that moreover have a high degree of purity thanks to the use of the melt yarn. Moreover, as said above, it leads to an enormous financial potential in the recycling of textile articles as part of the end-of-life processes of these articles. The disassembly of textile articles and the reuse of high-quality materials results in an enormous financial saving in the processing of textile waste. On the other hand, in this way, raw materials can be obtained for the production of new textile articles so that the financial saving also continues in the production of new textile articles.

According to an embodiment, the melt yarn is heat directly or indirectly. Direct heating is for example possible by means of a hot-air gun or by immersing the textile products in hot water. Indirect heating is for example possible by placing the textile article into an oven, or into a holder where hot air passes or into a holder where infra-red radiation is emitted. Of course, these are only examples and other techniques can also be used that are known in the field of heat generation.

According to a further embodiment, the disassembly of the textile articles is realized automatically or semi-automatically. In an embodiment, the textile articles are shaken or moved during the heating. As a result of the movement, the different parts are separated automatically once the melt yarn has melted. More preferably, the disassembly device comprises a heating unit such as a (tubular) oven in which the textile articles are moved, for example by means of a screw, tumbler or conveyor belt. Optionally, one can also provide a rotating cylinder in the disassembly device for further separating the parts of the textile article. In an embodiment, one or more steam generators can be provided for creating a humid air flow. This can be beneficial for the speed of the disassembly process. Note that although a high atmospheric humidity is indeed desired in the disassembly device or oven, the textile articles should however be dry. Humid textile articles can indeed have a negative impact on the disassembly speed since humid textile absorbs energy and this latent heat slows down the disassembly process.

Automatization of the method reduces the costs of the disassembly process since here, contrary to the existing recycling procedures, no or little manual work is required. Thanks to the use of a heating unit, tumbler and/or conveyor belt in the disassembly device, textile articles for disassembly can continuously be fed into the device. This results in an uninterrupted or continuous process, which further enhances the efficiency of the disassembly process.

According to a further embodiment, the melt yarn is removed after disassembling that textile article. Preferably, the melt yarn is removed automatically or semi-automatically. This is possible by means of one or more brushes that are present in the disassembly device and where the textile article parts can be passed along. In another embodiment, washing can be considered. As a result, the contamination of textile materials with the material of the melt yarn will be further reduced and textile materials with a higher quality will be are maintained. In a preferred embodiment, a cooling unit is provided after the heating unit to cool down the articles as well as the removed yarns.

In a preferred embodiment, a device according to the present invention will comprise a conveyor belt, that is appropriate for feeding the textile article to disassemble into a heating unit and for discharging the disassembled pieces of these articles away from the heating unit. The heating unit will be provided with heating elements such as infra-red radiators etc. for providing a correct temperature. Furthermore, in the heating unit, a tumbler or screw will be integrated, for moving the textile articles through the heating unit (swirling). Additionally, steam generators are also present.

In the following, the invention will be described by means of a non-limiting figure illustrating the invention, and not meant to be interpreted as limiting the scope of the invention.

EXAMPLES

Example 1

Table 1 shows melt yarn according to an embodiment of the present invention and that can be used for the production of textile articles that can be disassembled such as clothing but also mattresses, etc. Disassembling takes place by heating the article or the stitches that are made of melt yarn to a temperature that is approximately, equal to or higher than the melting temperature of the yarn.

| Polymer | Melting temperature | Elasticity modulus | Tensile strength | Elongation at breaking point |
|---|---|---|---|---|
| Polypropylene | 170° C. | 1.58 GPa | 39.5 MPa | 232% |
| Polyamide 11 | 190° C. | 1.33 GPa | 55 MPa | 320% |
| PLA | 175° C. | 3.6 GPa | 47 MPa | 6% |
| Polyester (PET-G, glycerol added) | 67° C. | 2.11 GPa | 35 MPa | 350% |

Other examples or useful yarns are

A polypropylene yarn with disassembling temperature of 176° C. and higher, a tensile strength of 20 N or 39.5 cN/Tex, 520 Dtex/3. This polyolefine-based yarn can be used for chemical recycling processes and can be used for stitching clothing, accessories and furniture textile. This yarn can moreover be provided in different Tex (higher or lower than the present example).

A biological polylactic acid yarn with disassembling temperature of 175° C. or higher, a tensile strength situated between 10 N and 30 N, 500 to 1500 Dtex/3 (depending on the requirements). This yarn is biologically degradable and is made of bio-sourced polyester.

This yarn, that is available in different dtex, is particularly appropriate for stitching clothing, accessories and furniture textile.

A bio-polyamid-based yarn with a disassembling temperature of 195° C. or higher, a tensile strength of 28 N and 900 Dtex/3. This yarn is a stronger yarn that dissolves at a higher temperature. As a result, it is particularly appropriate for implementation in work clothing, in addition to normal clothing, accessories and furniture textile of course. Available in different dtex.

Example 2

Disassembly will preferably take place by means of a device providing the correct disassembling temperature. Depending on the kind of article to disassemble as well as the amount, one can choose for a specific device.

Hereby, both direct and indirect heating can be applied. Table 2 describes possible processes that can be applied, depending on the nature of the article and the scale size:

| | Small number that needs processing | Large number that needs processing |
|---|---|---|
| Small textile article (e.g. hand bags, accessories, clothing, footwear, etc.) | Heat gun (with or without steam) iron (steam/convection oven) | Continuous tumbler oven |
| Large textile article (e.g. mattresses, furniture, car seats, etc.) | Heat gun (with or without steam) | Continuous oven |

Example 3

The polymer melt yarn can be supplemented with heat-conductive additives or materials. Examples of such melt yarn are:

A polypropylene homopolymer yarn with 10% of calcium carbonate filler inside. Melting point of the yarn is 176° C., available in different dtex.

A polypropylene homopolymer yarn with 5% of mic filler inside. Melting point of the yarn is 165° C., available in different dtex.

FIGURE DESCRIPTION

Figure 1:
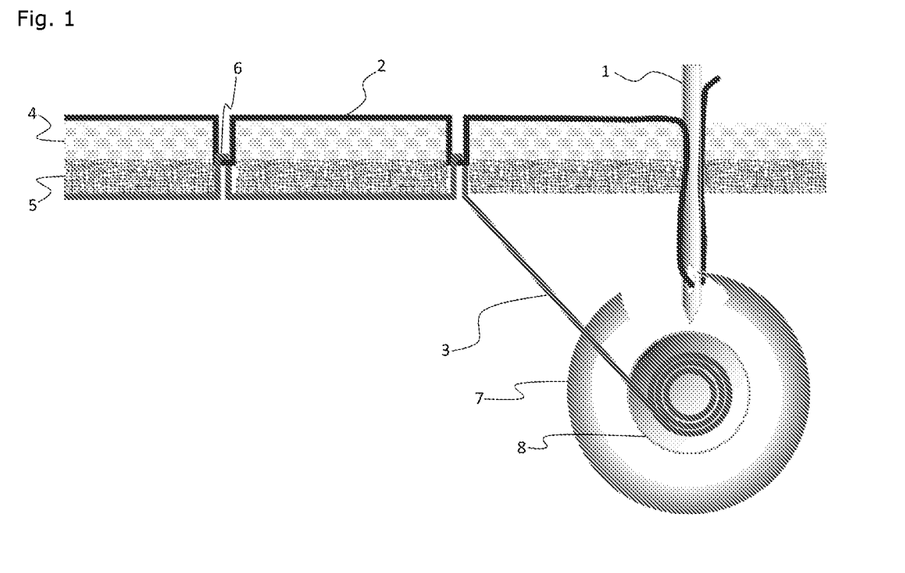
FIG. 1 shows a schematic illustration of the production of a textile article according to an embodiment of the invention.

FIG. 1 shows a schematic illustration of the production of a textile article that can be disassembled automatically or semi-automatically according to an embodiment of the invention.

In this example, a household sewing machine is used with one needle (1), one upper yarn (2) and one lower yarn (3). The figure illustrates the formation of the stitching between a first textile material (4) and a second textile material (5) by means of a simple lock stitch (6) in which the upper yarn and the lower yarn cross each other. A cross-section at the resulting stitch is shown. The lock stitch (6) is formed when the needle (1) goes with upper yarn (2) through both textile materials (4 and 5) and forms a loop under these materials. Subsequently, the grabber (7) turns this loop around the coil (8) onto which the lower yarn (3) had been wound.

For obtaining the built-in disassembling function, at least one of the upper yarn (2) or the lower yarn (3) should be made of the thermoplastic polymer melt yarn. In this figure, the lower yarn (3) was replaced by the melt yarn according to an embodiment of the invention since at the lock stitch, it is sufficient to replace one of the two used yarns by a melt yarn for obtaining a built-in disassembling function according to the method of the invention. The melt yarn of FIG. 1 consists of two longitudinally parallel thermoplastic polyester filaments with a melting temperature of 170° C. The filaments are twined to a melt yarn with a thickness characterized by a weight number of 125 dtex×2 and a length number Nm 80/2. The strength of the melt yarn illustrated as lower yarn (3) in FIG. 1 is 11.5 N and the elongation is between 18 and 21% over the total length of the melt yarn.

Moreover, this melt yarn was taken here as a lower yarn (3) and it was sewed with the sewing machine to the reverse side of the textile article. As an upper yarn (2), a standard yarn was used. In the finished textile article, only the upper yarn (2) is visible and the aesthetic characteristics are thus not affected by making use of the melt yarn as a lower yarn (3). In this way, one combines the built-in disassembling function with the aesthetic aspects of the standard yarn, without having to make special adjustments to the aesthetic aspects of the textile article or to the production facilities (namely the sewing machine). In an embodiment, melt yarn can be used for the upper yarn (2) and lower yarn (3), in which the melt yarn is the same yarn or is a melt yarn with different characteristics (e.g. as to the tensile strength, dtex, nature of the yarn, etc.).

Figure 2:
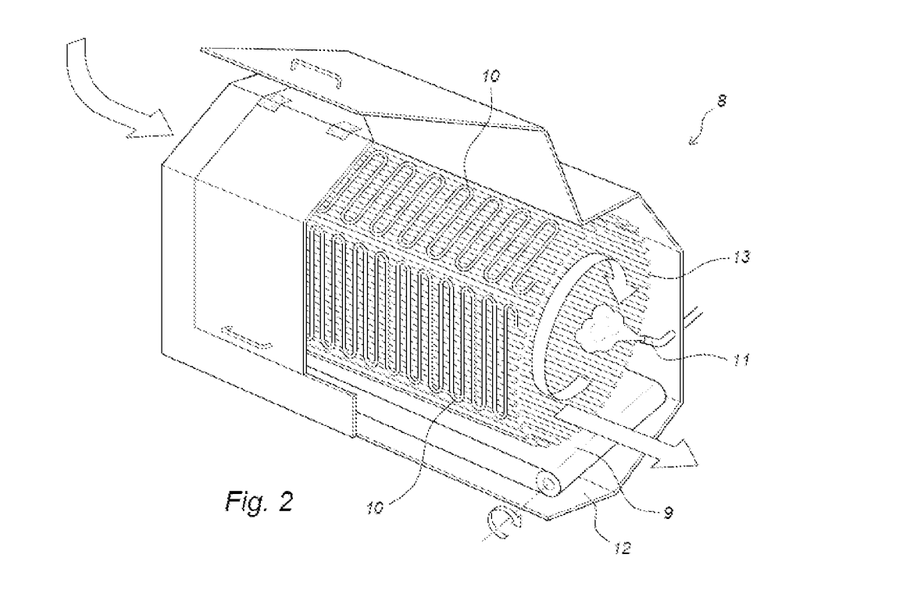
FIG. 2 shows a possible embodiment of a heating unit for disassembling a textile article.

FIG. 2 shows a possible heating unit (8) for use in the described disassembling process, in which the disassembling process is a continuous process for smaller textile articles such as clothing and accessories. In a preferred embodiment, the heating unit (8) will consist of two sections, namely a heating section and a cooling section (not shown in FIG. 2). In the heating section of the heating unit (8), a turbulent air flow is obtained by means of a tumbler function (13) of the device. The textile article is supplied by means of a conveyor belt (9) passing through the device. The articles are heated intensively and homogeneously by means of heat elements (10) such as heat resistors, infra-red heating, or other indirect heat sources. The forced heat convection is further increased as a result of the humid air flow, i.e. hot and pressurized steam via steam generators (11). A collection system (12) for produced liquid such as water can be provided at the bottom of the device. In maximum 5 minutes (preferably less than 3 minutes), the textile product will pass through the drying oven at temperatures of 60-200° C. The stitching yarn will melt (change its phase) and allows the different product components to disintegrate (manually or automatically, for example by means of the tumbler device). If polymer rivets are provided at the product with a melting temperature within this range, they will also melt and disintegrate.

The invention claimed is:

1. A method for the disassembly of a textile article, wherein the textile article can be disassembled automatically or semi-automatically and thus recycled or reused,
    wherein the textile article comprises at least two individual pieces,
        wherein the at least two individual pieces are attached to each other by at least one stitch,
    wherein the at least one stitch is selected from the group consisting of a chain stitch, a lock stitch, an overlock stitch, and a cover stitch,
    wherein the at least one stitch comprises at least one melt yarn,
    wherein the melt yarn has a melting temperature, and in which the melt yarn transitions from a solid phase to a liquid or semi-liquid phase at a temperature that is equal to or higher than the melting temperature of the melt yarn, and
    using heat to dissemble at least one of the melt yarn and the textile article to a temperature that is equal to or higher than said melting temperature of the melt yarn, and wherein the textile article is shaken or moved during the heating to aid in the disassembly of the textile article.

2. The method according to claim 1, wherein, the melting temperature of the melt yarn is between 60° C. and 200° C.

3. The method according to claim 1, wherein at least one melt yarn and at least one standard yarn are used during stitching, or at least two different melt yarns wherein the two melt yarns have different melting temperatures.

4. The method according to claim 2, wherein the melt yarn comprises between 40% and 100% of thermoplastic polymer, wherein one or more polymers are selected from the group of polyolefins, polyesters, polyoxymethylene (POM), polypropylene, polyurethane, polyamides, polylactic acid and co-polymers thereof.

5. The method according to claim 1, wherein the melt yarn is a mono- or multifilament.

6. The method according to claim 1, wherein the melt yarn is a twined multifilament.

7. The method according to claim 1, wherein the melt yarn is provided with one or more heat conduction increasing materials selected from the group of metals, ceramic materials and/or graphite.

8. The method according to claim 1, wherein the disassembly takes place in a heating unit provided with heating elements and optionally one or more steam generators.

9. The method according to claim 1, wherein the melt yarn is removed after disassembling said textile article.

10. The method according to claim 1, wherein the disassembly takes place in a device for disassembling a textile article provided with melt yarn, wherein the device comprises a heating unit, provided with heating elements and optionally one or more steam generators.

11. The method according to claim 1, wherein the textile article is shaken or moved by means of a screw, tumbler or conveyor belt.

12. The method according to claim 1, wherein the thickness of the melt yarn is characterized by a weight number between 0.003 g/m (3 tex) and 1.5 g/m (1500 tex).

13. The method according to claim 1, wherein the tensile strength of the melt yarn is between 4 N and 800 N.

14. The method according to claim 1, wherein the disassembly takes place in a disassembly device comprising a heating unit comprising a tubular oven in which the textile articles are moved by means of a screw, tumbler or conveyor belt.

15. The method according to claim 14, wherein textile articles are continuously fed into the disassembly device.

16. The method according to claim 14, wherein the disassembly device comprises a cooling unit after a heating unit, to cool down the articles as well as the removed yarns.

17. The method according to claim 1, wherein the automatic or semi-automatic disassembly is achieved without having to make any special adjustments to the aesthetic aspects of the textile article or to the sewing machine.

18. The method according to claim 1, wherein the textile article is disassembled in a non-destructive way into units consisting of only one material.

19. The method according to claim 1, wherein the automatic or semi-automatic disassembly results in materials that can be used as raw materials for the production of new textile articles.

* * * * *